United States Patent [19]

Siskin et al.

[11] 3,852,184

[45] Dec. 3, 1974

[54] ISOMERIZATION OF REFORMER FEED USING A METAL HALIDE/HYDROGEN HALIDE CATALYST

[75] Inventors: Michael Siskin, Maplewood; Joseph J. Porcelli, Scotch Plains, both of N.J.

[73] Assignee: Exxon Research and Engineering Company, Linden, N.J.

[22] Filed: Dec. 22, 1972

[21] Appl. No.: 317,609

Related U.S. Application Data

[63] Continuation-in-part of Ser. No. 210,607, Dec. 21, 1971, abandoned.

[52] U.S. Cl.................... 208/64, 208/134, 252/442, 260/666 P
[51] Int. Cl.... C10g 35/04, B01j 11/78, C07c 13/18
[58] Field of Search............ 208/134, 64; 260/666 P

[56] References Cited
UNITED STATES PATENTS

| | | | |
|---|---|---|---|
| 2,396,331 | 3/1946 | Marschner...................... | 260/666 P |
| 2,723,947 | 11/1955 | Oblad et al...................... | 260/666 P |
| 2,953,606 | 9/1960 | Dean et al....................... | 260/666 P |
| 3,201,494 | 8/1965 | Oelderik et al................ | 260/683.47 |
| 3,250,819 | 5/1966 | Cabbage........................... | 260/666 |
| 3,725,500 | 4/1973 | Kramer............................ | 260/666 P |

Primary Examiner—Delbert E. Gantz
Assistant Examiner—S. Berger
Attorney, Agent, or Firm—Roy J. Ott; J. Simon

[57] ABSTRACT

A process for upgrading reformer feedstocks containing alkylcyclopentanes by isomerizing said feedstock components in the presence of hydrogen and a catalyst mixture containing a metal halide, such as tantalum and/or niobium pentafluoride, and a protonic acid, such as hydrogen fluoride so that the alkylcyclopentanes are converted to the corresponding cyclohexane isomers.

16 Claims, No Drawings

ISOMERIZATION OF REFORMER FEED USING A METAL HALIDE/HYDROGEN HALIDE CATALYST

CROSS-REFERENCE TO RELATED APPLICATIONS

This application is a continuation-in-part of co-pending application Ser. No. 210,607, filed Dec. 21, 1971, and now abandoned.

BACKGROUND OF THE INVENTION

1. Field of the Invention

This invention relates to improvements in the reforming of hydrocarbon fractions. More particularly, the present invention is concerned with a reforming process wherein a feed containing alkylcyclopentanes is pretreated by subjecting the feed to isomerization in the presence of hydrogen and a catalyst mixture comprised of a metal halide and a protonic acid.

2. Description of the Prior Art

Reforming is a well known and widely used process for upgrading hydrocarbon fractions boiling in the motor gasoline or naphtha boiling range to increase their octane numbers and to improve their burning or engine cleanliness characteristics. In reforming, the hydrocarbon fraction is contacted at elevated temperatures and pressures in the presence of hydrogen or hydrogen enriched process gas with a solid catalytic material under conditions such that there is no net consumption of hydrogen. A variety of reactions occur during reforming including dehydrogenation of naphthenes to the corresponding aromatics, hydrocracking of paraffins, isomerization of straight-chained paraffins to form branch-chained paraffins, dehydrocyclization of paraffins and isomerization of compounds such as ethylcyclopentane to form methylcyclohexane which is readily converted to toluene.

In the reforming process, the conversion of cyclohexanes to aromatics and hydrogen is essentially quantitative. However, the conversion of alkylcyclopentanes to aromatics is less complete and a large portion of the alkylcyclopentanes is converted to cracked products, e.g., 40–50 percent, rather than the more desirable aromatic products. The selective isomerization of the alkylcyclopentanes of a reformer feed to alkylcyclohexanes has not heretofore been practical because the presence of components such as aromatics and olefins in the feed act as poisons to deactivate typical acidic catalysts.

SUMMARY OF THE INVENTION

It has now been found that the alkylcyclopentanes in a reforming feed can be efficiently isomerized to cyclohexanes prior to the reforming operation by contacting the feed, preferably in the presence of hydrogen, under isomerization conditions with a catalyst comprised of a metal halide and a protonic acid.

The metal halide used in combination with the protonic acid comprises the fluorides, bromides and chlorides (including those halides containing combinations of fluorine, bromine and chlorine) of the following metals: aluminum, gallium, tin, lead, vanadium, niobium, tantalum, arsenic, chromium, molybdenum, tungsten and the rare earth and transuranium metals, such as uranium and neodymium. The preferred metal halide catalyst constituents are tantalum and niobium halides, preferably tantalum pentafluoride, niobium pentafluoride and mixtures thereof.

The protonic acid catalyst component of the invention includes those acids or anhydrides (or mixtures thereof) capable of being a proton donor to the system and further being characterized by the formula HX, $R_aX_bQO_c$ or mixtures thereof where H is hydrogen; X is chlorine, bromine, fluorine and/or iodine; R is hydrogen, $C_1$–$C_4$ alkyl, $C_3$–$C_{10}$ cycloalkyl and/or $C_6$–$C_{10}$ aryl; Q is either phosphorus or sulfur; O is oxygen; $a$ is an integer ranging from 1 to 4 and $b$ and $c$ are integers ranging from 0 to 6. Preferably, the protonic acid is an anhydrous hydrogen halide. Useful materials include hydrogen bromide, hydrogen chloride and hydrogen fluoride, fluorosulfonic acid, non-fluorophosphoric acid, difluorophosphoric acid, trifluoromethanesulfonic acid, trifluoroacetic acid, bis (prefluoromethylsulfonyl) methane and the like. It is desirable, in order to avoid exchange reactions, that the halide moiety of the hydrogen halide or acid be one that will not cause undesirable exchange ractions with the metal halide constituent of the catalyst system. For example, if tantalum pentabromide is used as the metal halide constituent, the preferred hydrogen halide co-catalyst would be hydrogen bromide since the halogen moieties of both hydrogen chloride and hydrogen fluoride would exchange with the bromine atoms of the tantalum bromide metal constituent. Desirably, the halide moiety of the hydrogen halide and the metal halide are the same. The preferred hydrogen halide catalyst constituent is hydrogen fluoride.

The relative amounts of metal halide and protonic acid, such as hydrogen halide, may vary widely. In general, at least an equimolar amount of protonic acid relative to metal halide should be present in the reaction zone. The protonic acid/metal halide molar ratio is preferably at least 2:1, more preferably at least about 5:1. The upper limit on the protonic acid/metal halide molar ratio is not critical since the protonic acid may also function as a diluent or solvent for the reaction. The maximum amount thereof will be governed by cost and capacity considerations. Depending upon the relative amounts of catalyst constituents used, the catalyst, when no support is employed, may be a homogeneous solution of protonic acid and metal halide or a mixture of solid and dissolved metal halide in protonic acid.

The reforming feedstock which is pretreated in accordance with the invention includes those reformer feedstocks containing alkylcyclopentanes such as the mono-, di-, or polysubstituted $C_1$–$C_{10}$ alkylcyclopentanes. These compounds include, among others, methylcyclopentane, ethylcyclopentane, butylcyclopentane, pentylcyclopentanes, hexylcyclopentanes, cyclopentyl and alkylcyclopentyl cyclopentanes, cyclohexyl and alkylcyclohexyl cyclopentanes, 1,2-dimethyl cyclopentane, ethyl-methylcyclopentanes, monomethyl-decomethylcyclopentanes, monoalkyl-decaalkylcyclopentanes and the like. In general, the feed to be treated in accordance with the invention will include typical reformer feeds such as the normally liquid feedstocks boiling substantially within the range of from about 150° to 430°F., more particularly 180° to 350°F., such as a virgin naphtha, cracked naphtha, a coker naphtha, and the like.

Prior to the reforming operation, the reformer feed is treated in accordance with the invention by isomerization in the presence of the metal halide-protonic acid catalyst mixture and preferably hydrogen at a temperature in the range of −30° to 125°C., preferably in the range of 0° to 100°C. Most preferably, the reaction is conducted at a temperature between 20° to 60°C. The isomerization treating process is preferably conducted at a pressure sufficient to maintain the petroleum feedstock and catalyst in substantially the liquid phase. The use of hydrogen in the isomerization reaction is preferred and the hydrogen partial pressures in the reaction zone will generally vary from about 0 to 3,000, preferably from about 25 to 500 psig. Typically, from 0 to 25 moles, preferably from 0.05 to 10 moles of hydrogen per mole of petroleum feedstock are present in the reaction zone. The reaction time will depend upon the temperature used and the nature of the feedstock and, thus, may vary widely. In most cases, the reaction time will be within the range of 0.5 minute to 50 hours, preferably within the range of 1 to 500 minutes.

Hydrogen employed in the isomerization of the reformer feed may be derived from any suitable source. Typically, in a refinery operation, the hydrogen employed may be a crude or an impure hydrogen stream such as that obtained from a naphtha reforming operation. Again, because of the ability of the present catalyst to tolerate sulfur poisons, the hydrogen need not be purified for sulfur removal prior to use. Alternatively, hydrogen may be generated in situ by introducing hydrogen donors into the reaction zone during the course of the reaction. Examples of useful hydrogen donors include materials such as decalin, tetralin, methylcyclohexane and the like. Most preferably, elemental hydrogen is introduced into the reaction zone.

The treatment of the reformer feed by isomerization may be carried out in bulk, that is, in the absence of any solvent or in the presence of a solvent or diluent material. Useful solvent or diluent compositions include fluorinated paraffins, sulfolane, sulfur dioxide, sulfurylchloride fluoride, fluorinated acids and/or acid anhydrides, HF, etc. Hydrogen fluoride is the preferred reaction diluent when the metal portion of the catalyst system is a metal fluoride. When hydrogen fluoride is the diluent with catalysts made up of metal chlorides or bromides, an exchange reaction results converting the metal halide material to the metal fluoride. When a solvent or diluent is used, sufficient amounts are employed to maintain the viscosity of the reaction mixture at a desired level.

In the pretreating stage, the reformer feedstock, hydrogen (when used) and optional solvent will ordinarily be admixed with the catalyst in a substantially liquid phase operation. The contacting may be carried out in a plurality of serially connected mixing zones. After isomerization of the feed, the catalyst phase and hydrocarbon phase are separated in a settling zone and/or by acid wash of the hydrocarbon rich phase. The hydrocarbon phase is then recovered and sent to the reformer. Optionally, the metal halide, preferably metal fluoride, catalyst component may be impregnated upon an inert (to hydrogen halide) porous support material such as a fluorinated refractory oxide, fluorinated Vycor glass, graphite, polytetrafluoroethylene (Teflon) based supports, as Chromosorb T and Fluoropak 80, and the feedstock and hydrogen halide co-catalyst passed over the supported metal halide in either a liquid phase, gaseous phase or mixed phase operation. Alternatively, both the hydrogen halide and metal halide catalyst materials can be impregnated upon an HF-resistant support material and the feedstock passed over the catalyst.

In general, the amount of metal halide employed will vary from about 0.001 to 10, preferably 0.01 to 5.0 weight parts of metal halide per weight part of petroleum feedstock present in the reaction zone. When sulfur impurities are present in the feedstock, it is desirable, if maximum catalyst activity is desired, to have a molar excess of metal halide present in the reaction zone relative to the amount of sulfur poison present in the reaction zone at any point in time. Sulfur and sulfur compounds are believed to form complexes with the metal halide catalyst constituent. An equilibrium is established between the amount of sulfur complex formed and the amount of sulfur in the hydrocarbon phase. Accordingly, not all of the sulfur present reacts with or complexes with the metal halide catalyst constituent. Further, the complex formation reaction appears to be reversible in that the concentration of sulfur complex or reaction product is diminished when the catalyst is contacted with a sulfur-free feedstock. In an operation wherein a support catalyst is used, the reaction liquid hourly space velocity (the liquid volume of feed per hour per volume of catalyst) would be maintained at levels of less than about 200, usually between about 0.1 and 10.

The catalyst system of the present invention is neither adversely affected by the presence of sulfur compounds or aromatics such as benzene which are known to deactivate Friedel-Crafts catalysts. However, if maximum catalyst activity is desired, the feedstocks, diluents, and individual catalyst constituents should be purified prior to use to remove water, nitrogen, and/or nitrogen-containing compounds, such as amines or ammonia. Nitrogen-containing compounds form stable compounds or complexes with the catalyst constituents. The presence of small amounts of water or nitrogen-containing materials are tolerable if the corresponding catalyst loss or drop in catalyst activity can be accepted. Preferably, the water or nitrogen compound concentration within the reaction zone should not exceed about 0.01 wt. percent, preferably about 1 wppm, based on total catalyst. Most preferably, the isomerization reaction is conducted in the substantial absence of water and/or nitrogen-containing compounds.

The hydrocarbon phase separated from the catalyst phase afer the treating step is then employed as the feed in a reforming process using known techniques. The catalysts commonly used in the reforming process are those which possess hydrogenation-dehydrogenation activity. Thus, platinum or palladium carried on a support, such as an active form of alumina, are useful as catalyst for reforming. However, certain oxides of the IV, V and VI Groups of the Periodic System usually carried on a suitable support, are also known and used in the reforming process. Among the metal oxides, molybdenum oxide and chromium oxide, e.g., 10 wt. percent of molybdenum oxide or chromium oxide on alumina, are considered fairly good reforming catalysts. Other examples of specific reforming catalysts are known to those skilled in the art (such as those described in a book entitled "Catalytic Processes and Proven Catalysts" by Charles L. Thomas published by Academic Press, 1970, pp. 54–63) and may be used in accordance with the present invention.

The reforming step of the present invention is carried out using known process parameters. In general, the treated feed is contacted with the reforming catalyst in a reactor maintained at a temperature between about 800° and 1,000° F. and a superatmospheric pressure between about 150 and 1,000 psig. Typically, about 2,000 to 5,000 cubic feet of hydrogen per barrel of feed will be passed through the reforming reactor.

DESCRIPTION OF THE PREFERRED EMBODIMENTS

The following examples further illustrate the present invention. Unless otherwise specified, all percentages and parts are by weight.

EXAMPLE 1

Into a 1 liter Parr Model 4521 stirred Hastelloy C reactor, in a dry box, were placed a 55.87:44.13 volume percent mixture of methylcyclopentane (MCP) (112.21 ml, 1 mole) and benzene (88.63 ml, 1 mole). Tantalum pentafluoride (55.2 g., 0.20 mole) was then added to the reactor.

After addition of the tantalum pentafluoride, the reactor was removed from the dry box, closed, partially evacuated by aspirator, and 52 grams (2.6 moles) of hydrogen fluoride were added from a lecture bottle by direct connection. The reactor was then pressurized with 50 psig (pounds per square inch gauge) hydrogen (about 0.1 mole) and the reaction mixture was stirred at 600 rpm (revolutions per minute) for 2 hours at 50°C. A liquid sample was taken at 50°C. by connecting an evacuated 10 ml. stainless steel cylinder to the 1 liter reactor and using the difference in pressure to force liquid from the reactor into the sample container. The sample was cooled to −70°C. and an aliquot was analyzed on an Aerograph Model 1520 Gas Chromatograph with a DC200 on Chromosorb P column one-eighth inch by 30 feet) at 90°C. The results shown below indicate facile isomerization of the MCP to cyclohexane.

| Product Distribution | Vol. % |
|---|---|
| MCP | 11.89 |
| Cyclohexane | 43.63 |
| Benzene | 44.07 |
| Isohexanes | 0.41 |
| Total | 100.00 |
| Conversion | Percent |
| Amount of MCP Converted to Cyclohexane | 78.72 |
| MCP (MCP + Cyclohexane) × 100 | 21.35 |
| MCP at Equilibrium | 16.0 |

EXAMPLE 2

The procedure and catalyst of Example 1 was repeated using a fresh charge of feed. The reaction was carried out at 25°C. for 5 hours. The results of the test are set forth below:

| Product Distribution | Vol. % |
|---|---|
| MCP | 7.92 |
| Cyclohexane | 47.10 |
| Benzene | 43.65 |
| Isohexanes | 1.34 |
| Total | 100.01 |
| Conversion | Percent |
| Amount of MCP Converted to Cyclohexane | 85.82 |
| MCP (MCP + Cyclohexane) × 100 | 14.35 |
| MCP at Equilibrium | 10.1 |

As is evident from the above data, the catalyst system of the invention strongly promotes the conversion of methylcyclopentane to cyclohexane. The ability of the catalyst to promote this reaction is significant since the catalyst can be used to upgrade feedstocks employed in reforming operations where it is desirable to have the maximum amount of cyclohexane present relative to methylcyclopentane. Further, it is to be noted that high conversion levels were achieved in the presence of a large molar excess of benzene (relative to catalyst). In contrast, even minor quantities of benzene serve to deactivate Friedel-Crafts catalyst.

EXAMPLE 3

Utilizing the reactor and the identical procedure of Example 1 except that the feedstock was changed, a test was conducted to demonstrate the ability of the catalyst system of the present invention to selectively promote the isomerization of alkylcyclopentanes to cyclohexanes. In the test, 250 milliliters of a typical reformer feedstock boiling between 180° and 350°F. at atmospheric pressure was subjected to reaction at 25°C. for 2 hrs. at 600 rpm. Analysis of the feedstock and product, as determined using a Consolidated Electrodynamics Corporation Model 2HO3C mass spectrometer is set forth below:

| Product Distribution | Feed, Vol. % | Product, Vol. % |
|---|---|---|
| Aromatics ($C_8$–$C_{11}$) | 10.80 | 5.51 |
| Naphthenes ($C_6$–$C_{10}$) | 39.04 | 41.31 |
| Cyclopentanes | 13.32 | 7.86 |
| Cyclohexanes | 25.72 | 33.45 |
| Paraffins | 45.44 | 48.82 |
| Condensed Naphthenes | 4.69 | 4.34 |

As is evident from the above analysis, the amount of cyclopentanes present in the product stream was substantially less than the amount present in the feed. In contrast, the product stream was enriched in cyclohexanes relative to the feed stream.

EXAMPLE 4

Utilizing the reactor and the identical procedure of Example 1 except that the feedstock was changed, a test was conducted to demonstrate the ability to simultaneously carry out paraffin isomerization at high naphthene levels. The reaction conditions and results are set forth below:

| | | Volume % |
|---|---|---|
| Feed: | n-Hexane | 39.90 |
| | MCP | 27.32 |
| | Cyclohexane ($C_6H_{12}$) | 27.32 |
| | Benzene ($C_6H_6$) | 5.45 |
| Reaction Conditions: | Temp., °C. | 50 |
| | Time, hr. | 1 |
| | Stirring, rpm | 600 |
| | $P_{H2}$, psig | 50 |
| Product Distribution | | Volume % |
| $C_3$-$C_5$ | | 1.92 |
| 2,2-DMC4 | | 14.29 |
| 2,3-DMC$_4$ + 2-MC$_5$ | | 11.74 |
| 3-MC$_5$ | | 4.22 |
| n-C$_6$ | | 16.15 |
| MCP | | 7.56 |
| C$_\nu$C$_6$ | | 39.50 |
| C$_6$H$_6$ | | 4.47 |
| Total | | 99.85 |
| Conversions | | |
| % MCP of total Naphthenes | | 16.1 |
| n-C$_6$, % Conversion | | 40.5 |

-Continued

| | |
|---|---|
| $C_6H_6$, % Conversion | 18.0 |
| Naphthenes, % Conversion | 13.9 |
| n-$C_6$, % to Equilibrium | 68.8 |

As is evident from the analysis, the amount of cyclohexanes present in the product stream is substantially greater than the amount present in the feed. The n-hexane has simultaneously been isomerized to isohexanes in the presence of 54.64 volume percent naphthenes.

EXAMPLE 5

The reformer feedstock treated in Example 3 is subjected to typical reforming operation by contact with a 10 percent $MoO_3$ on activated alumina catalyst at a temperature of 900°F., pressure of 250–300 psig, recycle gas rate of about 4,000 SCF/B and a SV of 1.0 $WW^{-1}$ $hr.^{-1}$. The product is enriched in aromatics as compared to the product which would be produced from the identical reformer feed not pretreated in accordance with the invention.

EXAMPLE 6

The feedstock treated in Example 4 is subjected to a typical reforming operation by contact with a cogelled 32 percent chromia-68 percent alumina catalyst at a temperature of 530°C., pressure of 10 atm., LHSV of 0.5 $V_eV_c^{-1}$ $hr.^{-1}$ and a hydrogen circulation rate of 6 moles per mole of hydrocarbon. The product is enriched in aromatics as compared to the product which would be produced from the identical feed not pretreated in accordance with the invention.

What is claimed is:

1. A process for treating a reformer feedstock containing alkylcyclopentane and a component selected from the group consisting of sulfur compounds, aromatics, and mixtures thereof which comprises contacting said feedstock in the presence of hydrogen at a temperature between about −30° and 125°C. under substantially liquid phase isomerization conditions with a catalyst comprised of:
   a. a metal halide wherein said metal is aluminum, gallium, tin, lead, vanadium, niobium, tantalum, arsenic, chromium, molybdenum, tungsten, rare earth and/or transuranium metal and said halide is fluoride, chloride, bromide and/or iodide, and
   b. at least an equimolar amount, based on metal halide, of a hydrogen halide, said halide being fluoride, chloride, bromide and/or iodide, at least a portion of said metal halide being dissolved in said hydrogen halide; said contacting producing a treated feedstock having a reduced alkylcyclopentane content and an increased cyclohexane or alkylcyclohexane content.

2. The process of claim 1 wherein contacting is carried out at a temperature ranging from about 20° − 60°C.

3. The process of claim 1 wherein contacting is carried out in the presence of hydrogen.

4. The process of claim 1 wherein the additional component in the feedstock is an aromatic.

5. The process of claim 4 wherein the aromatic is benzene.

6. The process of claim 1 wherein said feedstock is treated in the presence of hydrogen at a temperature between about 0° and 100°C.

7. The process of claim 6 wherein said metal halide is tantalum halide, niobium halide or mixtures thereof.

8. The process of claim 7 wherein said metal halide is tantalum pentafluoride, niobium pentafluoride or mixtures thereof.

9. The process of claim 8 wherein the hydrogen halide metal halide molar ratio is at least 2:1.

10. The process of claim 9 wherein the hydrogen halide/metal halide molar ratio is at least 5:1.

11. The process of claim 10 wherein said metal halide is tantalum pentafluoride and said hydrogen halide is hydrogen fluoride.

12. A hydrocarbon conversion process which comprises:
   1. contacting a reformer feedstock containing an alkylcyclopentane and an aromatic in the presence of hydrogen at a temperature between about −30° and 125°C. under substantially liquid phase isomerization conditions with a catalyst comprised of:
      a. a metal halide wherein said metal is aluminum, tin, lead, vanadium, niobium, tantalum, arsenic, chromium, molybdenum, tungsten, rare earth and/or transuranium metal and said halide is fluoride, chloride, bromide, and/or iodide, and
      b. at least an equimolar amount, based on metal halide, of a hydrogen halide, said halide being fluoride, chloride, bromide and/or iodide, at least a portion of said metal halide being dissolved in said hydrogen halide,
   said contacting producing a treated feedstock having a reduced alkylcyclopentane content and an increased cyclohexane or alkylcyclohexane content;
   2. separating the treated feedstock from the catalyst, and
   3. subjecting the treated feedstock to a reforming operation.

13. The process of claim 12 wherein said metal halide is tantalum pentafluoride, niobium pentafluoride or mixtures thereof and said hydrogen halide is an anhydrous hydrogen fluoride present at a hydrogen halide/metal halide molar ratio of at least 2:1.

14. The process of claim 13 wherein the contacting is carried out at a temperature of about 20° − 60°C.

15. The process of claim 13 wherein the aromatic is benzene.

16. The process of claim 13 wherein the reformer feedstock boils substantially in the range of from about 180° to 350°F.

* * * * *